(12) United States Patent
Hasegawa

(10) Patent No.: US 11,613,263 B2
(45) Date of Patent: Mar. 28, 2023

(54) ELECTRONIC CONTROL DEVICE, VEHICLE CONTROL METHOD, NON-TRANSITORY TANGIBLE COMPUTER READABLE STORAGE MEDIUM

(71) Applicant: DENSO CORPORATION, Kariya (JP)

(72) Inventor: Kosuke Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 16/682,121

(22) Filed: Nov. 13, 2019

(65) Prior Publication Data

US 2020/0079393 A1 Mar. 12, 2020

Related U.S. Application Data

(63) Continuation of application No. PCT/JP2018/011271, filed on Mar. 22, 2018.

(30) Foreign Application Priority Data

May 22, 2017 (JP) .............................. JP2017-100804

(51) Int. Cl.
| | |
|---|---|
| *B60W 50/02* | (2012.01) |
| *B60W 10/04* | (2006.01) |
| *B60W 10/18* | (2012.01) |
| *B60W 10/20* | (2006.01) |
| *B60W 30/18* | (2012.01) |

(Continued)

(52) U.S. Cl.
CPC ............ *B60W 50/02* (2013.01); *B60W 10/04* (2013.01); *B60W 10/18* (2013.01); *B60W 10/20* (2013.01); *B60W 30/18163* (2013.01); *B60W 50/08* (2013.01); *G05D 1/0061* (2013.01); *G05D 1/0088* (2013.01); *G07C 5/02* (2013.01); *G07C 5/08* (2013.01); *B60W 2050/0072* (2013.01); *B60W 2710/18* (2013.01);

(Continued)

(58) Field of Classification Search
CPC ........... B60W 50/02; B60W 30/18163; B60W 10/18; B60W 50/08
See application file for complete search history.

(56) References Cited

U.S. PATENT DOCUMENTS

| 9,550,528 B1 * | 1/2017 | Hakeem | .................. G08G 1/162 |
| 2005/0131590 A1 * | 6/2005 | Kuge | ................. B60W 50/0097 |
| | | | 701/1 |

(Continued)

FOREIGN PATENT DOCUMENTS

| DE | 102015201588 A1 | 8/2016 |
| JP | 201684038 A | 5/2016 |
| WO | WO-2017/10264 A1 | 1/2017 |

*Primary Examiner* — Jelani A Smith
*Assistant Examiner* — Toya Pettiegrew
(74) *Attorney, Agent, or Firm* — Harness, Dickey & Pierce, P.L.C.

(57) ABSTRACT

An electronic control device provided in a vehicle that mounts an in-vehicle system is provided. The electronic control device may detect an abnormality that occurs in the in-vehicle system. The electronic control device may detect an operation related to a lane change. The electronic control device may store a travel plan for performing an autonomous driving of the vehicle. The electronic control device may acquire at least one of a subject vehicle information item on the vehicle, a surrounding information item on a surrounding environment of the vehicle, and a driver information item on a driver.

9 Claims, 3 Drawing Sheets

(51) Int. Cl.
*B60W 50/08* (2020.01)
*G05D 1/00* (2006.01)
*G07C 5/02* (2006.01)
*G07C 5/08* (2006.01)
*B60W 50/00* (2006.01)

(52) U.S. Cl.
CPC ... *B60W 2710/20* (2013.01); *B60W 2720/106* (2013.01); *G05D 2201/0213* (2013.01)

(56) References Cited

U.S. PATENT DOCUMENTS

| | | |
|---|---|---|
| 2016/0091896 A1 | 3/2016 | Maruyama |
| 2016/0114811 A1* | 4/2016 | Matsuno ............... B60W 10/20 |
| | | 701/23 |
| 2016/0133117 A1* | 5/2016 | Geller .................... A61B 5/746 |
| | | 340/457 |
| 2017/0225685 A1* | 8/2017 | Aoki ...................... B60Q 1/346 |
| 2017/0293299 A1* | 10/2017 | Matsushita ........... B60W 50/12 |
| 2018/0188727 A1* | 7/2018 | Zhuang ................ G05D 1/0088 |
| 2018/0194364 A1 | 7/2018 | Asakura et al. |
| 2019/0039626 A1* | 2/2019 | Hatano ................. B60W 30/14 |

* cited by examiner

FIG. 3

| TIME WHEN ABNORMALITY OCCUR / LANE CHANGE PURPOSE | (A) BEFORE STARTING LANE CHANGE | (B) AFTER STARTING LANE CHANGE TO BEFORE ENTERING ADJACENT LANE | (C) AFTER ENTERING ADJACENT LANE |
|---|---|---|---|
| (1) ARRIVE AT DESTINATION, MERGE LANES, KEEP LEFT LANE | STOP LANE CHANGE | COMPLETE LANE CHANGE | COMPLETE LANE CHANGE |
| (2) DIVERSION POINT | COMPLETE LANE CHANGE | COMPLETE LANE CHANGE | COMPLETE LANE CHANGE |
| (3) AVOID OBSTACLE | STOP LANE CHANGE | COMPLETE LANE CHANGE | COMPLETE LANE CHANGE |
| (4) OVERTAKE PRECEDING VEHICLE | STOP LANE CHANGE | STOP LANE CHANGE | COMPLETE LANE CHANGE |
| (5) PARK DUE TO DRIVER IN ABNORMAL STATE | COMPLETE LANE CHANGE | COMPLETE LANE CHANGE | COMPLETE LANE CHANGE |

ELECTRONIC CONTROL DEVICE, VEHICLE CONTROL METHOD, NON-TRANSITORY TANGIBLE COMPUTER READABLE STORAGE MEDIUM

CROSS REFERENCE TO RELATED APPLICATIONS

The present application is a continuation application of International Patent Application No. PCT/JP2018/011271 filed on Mar. 22, 2018, which designated the U.S. and claims the benefit of priority from Japanese Patent Application No. 2017-100804 filed on May 22, 2017. The entire disclosures of all of the above applications are incorporated herein by reference.

TECHNICAL FIELD

The present disclosure relates to an electronic control device, a vehicle control method, and a non-transitory tangible computer readable storage medium mounted on an autonomous driving vehicle.

BACKGROUND

In recent years, development for autonomous driving of automobiles has been promoted. In particular, an autonomous driving vehicle in which an in-vehicle system autonomously performs all of acceleration, steering, and braking of the vehicle, and a driver manually drives the vehicle when requested by the system has been actively developed.

SUMMARY

The present disclosure provides an electronic control device. The electronic control device is provided in a vehicle that mounts an in-vehicle system. The electronic control device may detect an abnormality that occurs in the in-vehicle system. The electronic control device may detect an operation related to a lane change. The electronic control device may store a travel plan for performing an autonomous driving of the vehicle. The electronic control device may acquire at least one of a subject vehicle information item on the vehicle, a surrounding information item on a surrounding environment of the vehicle, and a driver information item on a driver.

BRIEF DESCRIPTION OF DRAWINGS

The features and advantages of the present disclosure will become more apparent from the following detailed description made with reference to the accompanying drawings. In the drawings:

FIG. 3 is an explanatory diagram showing a combination between a purpose of a lane change and a lane change operation when an abnormality occurs, and completion or cancellation of the lane change according the first embodiment.

DETAILED DESCRIPTION

Figure 1:
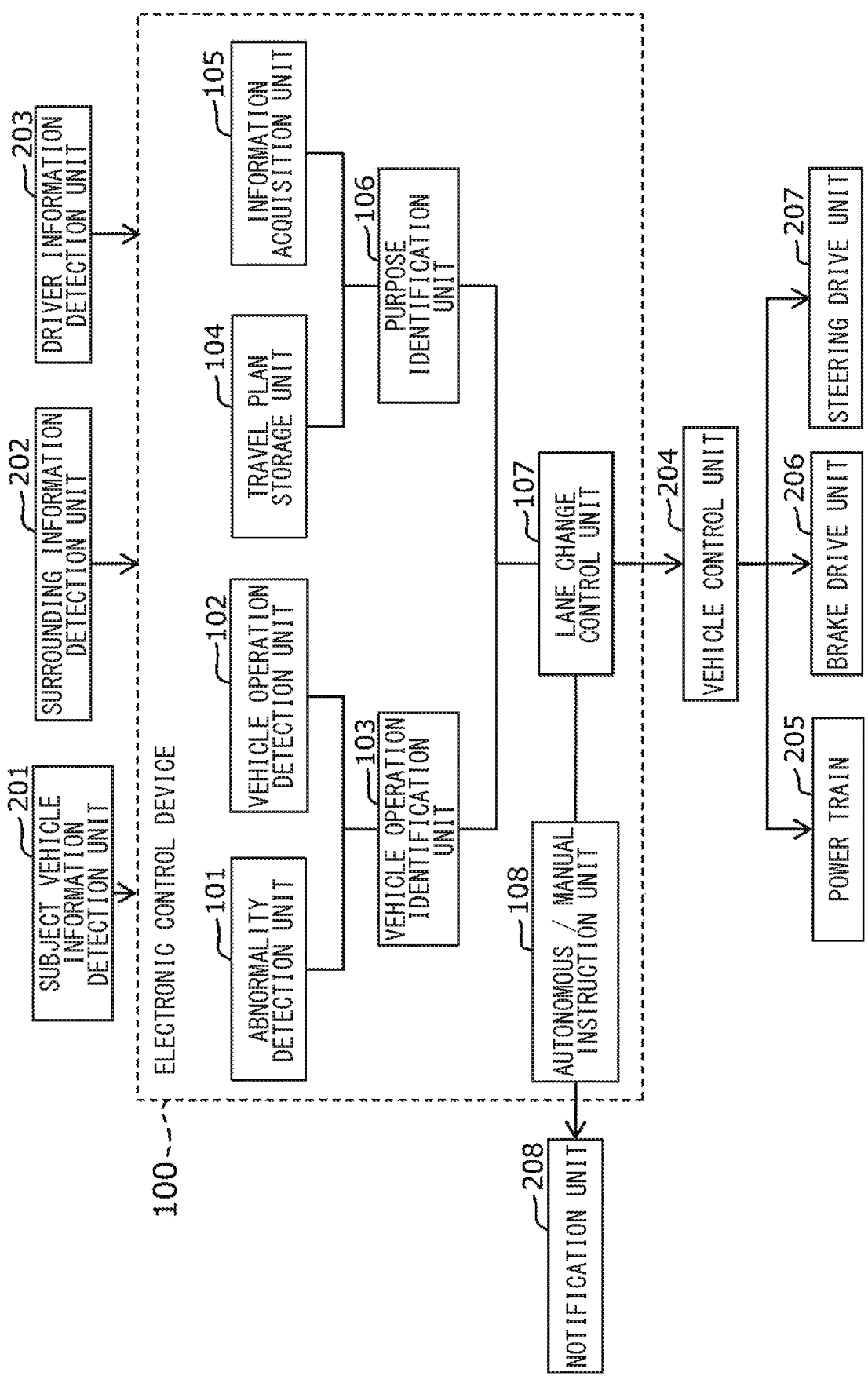
FIG. 1 is a block diagram showing an in-vehicle system including an electronic control device according to a first embodiment.

For example, in the development of an autonomous driving, the development of a fail operational technique for ensuring the safety of the vehicle in the case where an abnormality or a failure occurs in the in-vehicle system during the autonomous driving is advancing.

For example, a travel control device that performs a fail operation such that a vehicle returns to the original travel lane when an abnormality occurs in the in-vehicle system while the autonomous driving vehicle performs an overtake control has been proposed.

An overtake control includes a control to perform a lane change from a traveling lane to a passing lane, and a control to perform a lane change again to return the original lane after overtaking a target vehicle traveling on the passing lane. The lane change of the vehicle is performed not only when the overtake control is performed but also when a course of the vehicle is changed, when an obstacle on the road is avoided, or the like. The inventor has found that, depending on the situation, a fail operation to return to the original traveling lane is performed, a result that is not suitable for a travel purpose or a safe travel may occur when an abnormality occurs in the in-vehicle system. Such a difficulty is not well-known, but the inventor discovered uniquely.

The present disclosure provides an electronic control device, a vehicle control method, and a non-transitory tangible computer readable storage medium that can achieve a travel purpose while ensuring a safety of a vehicle even when an abnormality occurs in an autonomous driving vehicle.

An example embodiment of the present disclosure provides an electronic control device provided in a vehicle that mounts an in-vehicle system. The electronic control device includes an abnormality detection unit, a vehicle operation detection unit, a vehicle operation identification unit, a travel plan storage unit, an information acquisition unit, a purpose identification unit, and a lane change control unit. The abnormality detection unit detects an abnormality that occurs in the in-vehicle system. The vehicle operation detection unit detects an operation related to a lane change of the vehicle. The vehicle operation identification unit identifies the operation related to the lane change when the abnormality occurs. The travel plan storage unit stores a travel plan for performing an autonomous driving of the vehicle. The information acquisition unit acquires at least one of a subject vehicle information item on the vehicle, a surrounding information item on a surrounding environment of the vehicle, and a driver information item on a driver. The purpose identification unit identifies a purpose of the lane change of the vehicle based on at least one of the travel plan, the subject vehicle information item, the surrounding information item, and the driver information item. The lane change control unit determines whether to complete or cancel the lane change based on the operation related to the lane change when the abnormality occurs and the purpose of the lane change, and issue an instruction whether to complete or cancel the lane change.

In the example embodiment of the present disclosure, even when the abnormality occurs in the autonomous driving vehicle during the lane change operation, the electronic control device can achieve the travel purpose such as a destination arrival of the vehicle and safely drive or stop the vehicle.

Another example embodiment of the present disclosure provides a vehicle control method. The vehicle control method includes: detecting an abnormality that occurs in an in-vehicle system; detecting an operation related to a lane change of a vehicle; identifying the operation related to the lane change when the abnormality occurs; acquiring at least one of a subject vehicle information item on the vehicle, a surrounding information item on a surrounding environment of the vehicle, and a driver information item on a driver; identifying a purpose of the lane change of the vehicle based on at least one of a travel plan to perform an autonomous driving of the vehicle, the subject vehicle information item, the surrounding information item, and the driver information item; and determining whether to complete or cancel the lane change based on the operation related to the lane change when the abnormality occurs and the purpose of the lane change, and issuing an instruction whether to complete or cancel the lane change.

In the example embodiment of the present disclosure, even when the abnormality occurs in the autonomous driving vehicle during the lane change operation, the electronic control method can achieve the travel purpose such as a destination arrival of the vehicle and safely drive or stop the vehicle.

Another example embodiment of the present disclosure provides a non-transitory tangible computer readable storage medium. The non-transitory tangible computer readable storage medium includes instructions executed by a processor of an electronic control device. The instructions includes: detecting an abnormality that occurs in an in-vehicle system; detecting an operation related to a lane change of a vehicle; identifying the operation related to the lane change when the abnormality occurs; acquiring at least one of a subject vehicle information item on the vehicle, a surrounding information item on a surrounding environment of the vehicle, and a driver information item on a driver; identifying a purpose of the lane change of the vehicle based on at least one of a travel plan to perform an autonomous driving of the vehicle, the subject vehicle information item, the surrounding information item, and the driver information item; and determining whether to complete or cancel the lane change based on the operation related to the lane change when the abnormality occurs and the purpose of the lane change, and issuing an instruction whether to complete or cancel the lane change.

In the example embodiment of the present disclosure, even when the abnormality occurs in the autonomous driving vehicle during the lane change operation, the non-transitory tangible computer readable storage medium can achieve the travel purpose such as a destination arrival of the vehicle and safely drive or stop the vehicle.

Hereinafter, a configuration and a function of an electronic control device according to the present disclosure will be described with reference to the drawings.

First Embodiment

FIG. 1 shows a configuration of an electronic control device 100 and a device connected to the electronic control device 100 according to a first embodiment. The electronic control device 100 includes an abnormality detection unit 101, a vehicle operation detection unit 102, a vehicle operation identification unit 103, a travel plan storage unit 104, an information acquisition unit 105, a purpose identification unit 106, a lane change control unit 107, and an autonomous and manual instruction unit 108.

The electronic control device 100 is connected, via an in-vehicle network, to an information detection device that acquires information necessary for traveling of the vehicle, a vehicle control device for driving the vehicle, and a device configuring an in-vehicle system such as an interface. As shown in FIG. 1, the information detection device may include a subject vehicle information detection unit 201, a surrounding information detection unit 202, or a driver information detection unit 203. The vehicle control device may include a vehicle control unit 204, a power train 205, a brake drive unit 206, a steering drive unit 207, or the like that drives the vehicle based on an instruction from the vehicle control unit 204. Further, the interface may include a notification unit 208 that notifies the driver of various information items.

The subject vehicle information detection unit 201 may include a vehicle speed sensor, an acceleration sensor, a yaw rate sensor, a GPS, or the like. The surrounding information detection unit 202 may include a camera, a radar, a distance measuring sensor, or the like that acquires information related to a vehicle traveling around the subject vehicle, and a map database that acquires information related to the road on which the subject vehicle is traveling. The driver information detection unit 203 may include a sensor that acquires information related to the physical condition of the driver, or the like.

The device which configures an in-vehicle system is not limited to the example shown in FIG. 1. In the in-vehicle system of the vehicle provided with the electronic control device 100 of the present disclosure, it is preferable that each device has a redundant configuration with a dual configuration so that the vehicle is capable of continuing the autonomous driving even when an abnormality occurs in a part of the in-vehicle system. The electronic control device 100 is not limited to that used in a system having a redundant configuration. Further, the electronic control device itself of the present disclosure may be configured redundantly.

Hereinafter, a configuration of the electronic control device 100 and a device connected to the electronic control device 100 through an in-vehicle network according to the first embodiment will be described with reference to FIG. 1.

The abnormality detection unit 101 detects an abnormality that occurs in the in-vehicle system. The abnormality of the in-vehicle system includes an abnormality of the in-vehicle network in addition to a failure of the device configuring the in-vehicle system such as the information detection device or the vehicle control device. The abnormality detection unit 101 is capable of detecting the occurrence of an abnormality in the in-vehicle system by, for example, receiving a signal indicating that an abnormality has occurred in any device of the in-vehicle system from the in-vehicle network, or detecting information that a signal transmitted from the information detection device is not normally input.

The vehicle operation detection unit 102 detects an operation related to a lane change among various operations such as normal driving, acceleration and deceleration, and left or right turn of the vehicle. The vehicle operation detection unit 102 is capable of detecting which one of a series of operations related to the lane change based on the information input to the electronic control device 100. For example, the vehicle operation detection unit 102 detects the operation related to the lane change of the vehicle based on the speed information item, the traveling direction information item, the steering information item, the inclination of the vehicle with respect to the traveling direction, or the yaw rate information item input from the subject vehicle information detection unit 201, the image information item input from the surrounding information detection unit 202, or information whether the vehicle is showing a turn signal.

The start of the lane change of the vehicle is capable of being determined, for example, from at least one of a traveling direction information item, a steering information item, a vehicle inclination, and a yaw rate. It may be determined whether the vehicle has entered the adjacent lane based on, for example, the positional relationship between the lane boundary line acquired from the image information and the subject vehicle.

Here, the lane change in the present disclosure indicates that a vehicle moves from a traveling lane to a different lane. The lane change may include moving from a lane to an adjacent lane on a road having multiple lanes, moving on an expressway to merge from the entrance lane into a main line, or moving to a lane of a different route at a diversion point.

Further, the operation related to the lane change in the present disclosure indicates an operation necessary for the vehicle to change the lane. The operation related to the lane change may include not only an operation while the vehicle moves to the adjacent lane and actually changes the lane, but also operations before and after moving the lane, for example, operations displaying a turn signal, and turning off the turn signal after moving the lane.

The vehicle operation identification unit 103 identifies which operation the vehicle is performing when an abnormality occurs in the in-vehicle system based on the detection results of the abnormality detection unit 101 and the vehicle operation detection unit 102. In the example of the first embodiment, the operation related to the lane change is divided into three phases. In the phases:

(A) A turn signal is displayed in order to change the lane, but the vehicle is not moving toward the adjacent lane, and before starting the actual lane change;

(B) After the vehicle starts the lane change by starting to move toward the adjacent lane, before the vehicle enters the adjacent lane; and (C) After the vehicle enters the adjacent lane.

The vehicle operation identification unit 103 identifies the operation performed when the abnormality occurs in the in-vehicle system from the above operations (A) to (C). The classification of operations related to the lane change into the stages (A) to (C) is merely an example. The vehicle operation identification unit 103 may classify the operation related to the lane change into stages other than the stages (A) to (C) and identify the operation related to the lane change when an abnormality occurs.

Here, "enter" in the present disclosure indicates that a predetermined part of the vehicle enters the adjacent lane. The predetermined part of the vehicle may include a specific part of the vehicle (for example, a front tire located on the adjacent lane side) or a different part of the vehicle depending on a condition.

The travel plan storage unit 104 stores a travel plan for performing autonomous driving, which is generated based on the destination input via the car navigation system of the vehicle or the selected route. This travel plan includes information such as the planned travel speed of the vehicle and the planned travel route.

The information acquisition unit 105 acquires information related to the vehicle (corresponding to the subject vehicle information of the present disclosure) from the subject vehicle information detection unit 201. The information acquisition unit 105 acquires information related to the surrounding environment of the vehicle such as the road on which the subject vehicle is traveling or the surrounding vehicle from the surrounding information detection unit 202. The information acquisition unit 105 acquires information related to a driver driving the vehicle (corresponding to the driver information of the present disclosure) from the driver information detection unit 203. The information acquisition unit 105 may acquire all of the information items or a part of the information items.

The subject vehicle information indicates the state of the vehicle. The subject vehicle information may include information such as the vehicle speed information item, the acceleration information item, a steering information item, and a subject vehicle position. The surrounding information may include information such as the number of surrounding vehicles traveling around the subject vehicle, distance information between the subject vehicle and the surrounding vehicle, traffic information and map information of the road on which the subject vehicle is traveling. The driver information may include information such as the driver's state, for example, the driver's body temperature, pulse, brain waves, face orientation or line of sight. The driver information may further include a driver's arousal level (sleep state or not) or information indicating whether or not the driver is in a poor physical condition determined based on the driver's state.

The information related to the surrounding environment may include not only information indicating the state of the road or the like on which the subject vehicle is traveling, but also the state of the surrounding vehicle traveling around the subject vehicle. This information is obtained by, for example, a sensor or the like mounted on the subject vehicle, a database or the like mounted on the subject vehicle, or by wireless communication from a roadside machine or the surrounding vehicle. The information on the driver indicates the behavior and state of the driver. The information on the driver may include information obtained directly by a sensor, a camera, or the like. The information on the driver may include information calculated based on information obtained by the sensor or the like, for example, information indicating the driver's arousal level (sleepiness) and a poor physical condition of the driver.

The purpose identification unit 106 identifies the purpose of the lane change for the vehicle based on at least one of the travel plan stored in the travel plan storage unit 104, the subject vehicle information item, the surrounding information item, and the driver information item acquired by the information acquisition unit 105. In the first embodiment, the purpose identification unit 106 determines whether the purpose corresponds to destination arrival based on the travel plan, merging the lanes or keeping the left lane, changing the lane at a diversion point on such as a highway, changing the lane for avoiding an obstacle in the travel route, changing the lane for overtaking the preceding vehicle, or changing the lane for stopping the vehicle due to the occurrence of an abnormality in the driver. Alternatively, the purpose identification unit 106 may identify a purpose of the lane change other than the above purposes.

The lane change control unit 107 determines whether to complete or cancel the lane change that is being executed based on the operation related to the lane change at the time of occurrence of the abnormality identified by the vehicle operation identification unit 103 and the purpose of the lane change identified by the purpose identification unit 106. The lane change control unit 107 instructs the vehicle control unit 204 to complete or cancel the lane change.

In the present disclosure, the instruction may include the instruction by outputting the signal indicating the completion or cancelation of the lane change. The instruction may include the completion of the lane change by not outputting a specific signal when instructing completion of the lane change. The instruction may include instructing the completion or cancelation of the lane change indirectly by instructing the lane to travel.

The vehicle control unit 204, which receives the instruction of the completion or cancelation of the lane change from the lane change control unit 107, outputs a control signal to the vehicle control device, such as the power train 205, the brake drive unit 206, or the steering drive unit 207. For example, when the lane change is to be completed, the vehicle control unit 204 outputs a signal for increasing the steering angle to the steering drive unit 207. When the lane change is to be canceled, the vehicle control unit 204 outputs a signal for decreasing the steering angle to the steering drive unit 207.

In FIG. 1, the vehicle control unit 204 is provided separately from the electronic control device 100. Alternatively, the vehicle control unit 204 may be incorporated in the electronic control device 100.

The autonomous and manual instruction unit 108 instructs the notification unit 208 to notify the driver of switching from autonomous driving to manual driving by the driver after the lane change is completed or canceled. The notification unit 208 notifies a message prompting the driver to switch to manual driving by a screen or sound based on the instruction from the autonomous and manual instruction unit 108.

For example, the autonomous and manual instruction unit 108 instructs the notification unit 208 to switch to the manual driving after the lane change is completed and the vehicle normally travels the changed lane for a predetermined distance or after the lane change is canceled and the vehicle normally travels the original lane for a predetermined distance. With this configuration, when it is possible to safely take over the driving from the autonomous driving to the manual driving, the driver is capable of receiving the notification about the driving switching from the notification unit 208 and switching to the manual driving.

In the first embodiment, the autonomous and manual instruction unit 108 instructs the switch from the autonomous driving to the manual driving after the lane change is completed or canceled. Alternatively, the autonomous and manual instruction unit 108 may instruct the notification unit 208 to switch from autonomous driving to the manual driving immediately after the abnormality detection unit 101 determines that an abnormality has been detected.

In the present disclosure, the term "after the lane change is completed or canceled" may be any time later than the lane change, and include transmitting a signal at a time point immediately after the lane change is completely completed or a time point immediately after the lane change is canceled. The term "after the lane change is completed or canceled" may include transmitting a signal at a time point when another condition is satisfied.

Figure 2:
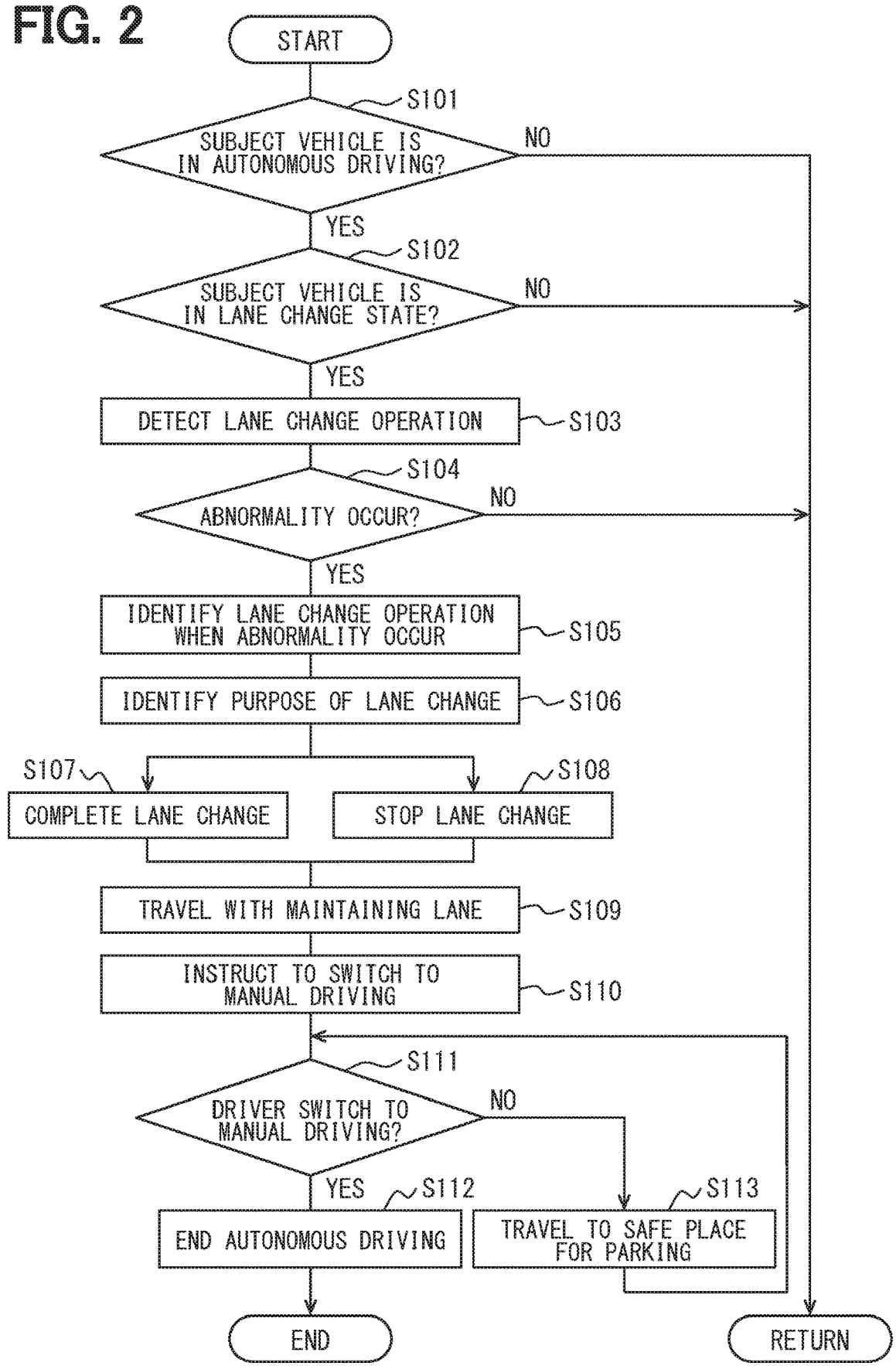
FIG. 2 is a flowchart showing an operation of the electronic control device according to the first embodiment.

Next, the operation of the electronic control device 100 will be described with reference to a flowchart of FIG. 2.

At S101, the electronic control device 100 determines whether the vehicle provided with the electronic control device 100 is in the autonomous driving. When the electronic control device 100 determines that the vehicle is in the autonomous driving, the following processing is continued.

At S102, the vehicle operation detection unit 102 detects whether the vehicle performs an operation related to the lane change. At S102, when the vehicle operation detection unit 102 detects that the vehicle performs an operation related to the lane change, the processing proceeds to S103.

At S103, the vehicle operation detection unit 102 detects the operation being performed related to the lane change.

At S104, the abnormality detection unit 101 detects whether an abnormality occurs in the in-vehicle system. At S104, the abnormality detection unit 101 detects that an abnormality occurs, the processing proceeds to S105.

At S105, the vehicle operation identification unit 103 identifies the operation related to the lane change of the vehicle when the abnormality detected at S104 occurs.

At S106, the purpose identification unit 106 acquires at least one of the travel plan, the subject vehicle information item, the driver information item, and the surrounding information item, and identifies the purpose of the lane change based on the acquired information item. The lane change control unit 107 determines whether to complete or cancel the lane change based on the operation related to the lane change identified by the vehicle operation identification unit 103 at S105 and the purpose of the lane change identified by the purpose identification unit 106 at S106. The lane change control unit 107 instructs the vehicle control unit 204 to complete or cancel the lane change.

At S107 and S108, the vehicle control unit 204 completes (S107) or cancels (S108) the lane change based on the instruction from the lane change control unit 107.

At S109, when the lane change is completed (S107), the vehicle travels in the new lane after the lane change. When the lane change is canceled (S108), the vehicle travels in the lane on which the vehicle originally travels.

At S110, the autonomous and manual instruction unit 108 instructs the notification unit 208 to notify the driver of switching from autonomous driving to manual driving by the driver.

At S111, the electronic control device 100 determines whether the driver switches to manual driving in response to the switching instruction to manual driving at S110. When the driver switches from autonomous driving to manual driving, the processing proceeds to S112 and the autonomous driving is terminated. On the other hand, when the driver does not switch to manual driving, the processing proceeds to S113. At S113, the in-vehicle system continues to travel by autonomous driving and stops the vehicle at a safe place.

The order of the operations in S105 and S106 is optional. Further, the order of other operations may be changed as appropriate.

A specific example of the combination between the operation related to the lane change and the purpose of the lane change, and the determination of completion or cancellation of the lane change will be described below. FIG. 3 shows the instruction contents of the lane change control unit 107 when the operation related to the lane change in a case where an abnormality occurs corresponds to each of the above-described cases (A) to (C) for each purpose of the lane change, that is, the lane change is completed or canceled. With reference to FIG. 3, the instruction content of the lane change control unit 107 for each purpose of the lane change will be described below.

(1) When the purpose of lane change is destination arrival, lane merge, or keep left The following is an example of the operation when the purpose of lane change is destination arrival, lane merge, or keep left.

The lane change for arriving at the destination may include moving to the right or left lane as a preparation for making a right or left turn at the intersection, moving to the right lane in order to travel in the rightmost lane adjacent to a diversion point for traveling to the right direction before the vehicle arrives at the diversion point, which will be described below.

For example, based on the travel plan for which a diversion toward the destination is planned for the future, the position information of the vehicle acquired from the GPS, and the map information acquired from the map database, when the subject vehicle is determined to travel on a different lane from the lane adjacent to the diversion point, the purpose identification unit 106 identifies that the purpose of the lane change is the destination arrival.

When the operation related to the lane change at the time of occurrence of abnormality is (A), the lane change of the vehicle is canceled. On the other hand, in the case of (B) or (C), the lane change is to be completed.

When the operation related to the lane change at the time of occurrence of an abnormality is (A), the vehicle switches to manual driving by the driver while traveling in the lane on which the vehicle originally travels, or the vehicle switches to manual driving by the driver after the vehicle stops in a safe place. Thereafter, the driver changes the lane in order to arrive at the destination by manual driving.

The reason for canceling the lane change in the case of (A) is that the vehicle is in a situation that the vehicle has not started changing the lane and it has not been determined that the vehicle is capable of changing lanes safely. Thus, it is desirable, from the view of safety, to continue traveling in the present lane while confirming safety. Further, in the case of (A), it is highly possible that the lane change can be performed in time for the future diversion by manual driving by the driver.

On the other hand, when the operation related to the lane change at the time of occurrence of an abnormality is (B) or (C), the vehicle switches to manual driving by the driver while traveling in the changed lane, or the vehicle switches to manual driving by the driver after the vehicle stops in a safe place. The reason for canceling the lane change in the case of (B) or (C) is as follows.

In the case of (B), when the lane change is canceled, there is no time to move to the lane adjacent to the diversion point. Therefore, even when the driver switches to manual driving, it is difficult to change the lane in time for the future diversion. Therefore, it is desirable to complete the lane change to ensure the traveling purpose. Further, when the lane change is canceled, it is conceivable that the driver rushes to change the lane in a state where the safety confirmation is insufficient. Thus, it is desirable to complete the lane change from the view of safety.

In the case of (C), since the vehicle has already entered the adjacent lane, it is more likely that the safety of the vehicle can be secured by completing the lane change than returning to the original lane.

Therefore, in the case of (B) or (C), the lane change is to be completed.

For another example, based on the travel plan for traveling on an expressway, the position information of the vehicle acquired from the GPS, and the map information acquired from the map database, when the subject vehicle is determined to enter the expressway and travel on a merging lane, the purpose identification unit 106 identifies that the purpose of the lane change is the lane merge.

In the case where the purpose of the lane change is lane merge, similarly to the case of the purpose of the destination arrival, when the operation related to the lane change at the time of occurrence of abnormality is (A), the lane change of the vehicle is canceled, and when the operation is (B) or (C), the lane change is completed.

The reason for canceling or completing the lane change in the case of (A), (B), or (C) is as follows.

In the case of (A), as described above, it is desirable from the view of safety to continue to travel on the present lane while confirming safety. Moreover, even when the lane change is canceled, there is time until the subject vehicle arrives at the merging point and it is highly possible that the merge can be performed by manual driving by the driver, so that the traveling purpose can be achieved.

In the case of (B), when the lane change is canceled, there is no time to merge into the lane again. Thus, there is a high possibility that the vehicle will stop at the front end of the merging point. Even when the driver switches to the manual driving, it is difficult to merge from a state where the vehicle stops. Therefore, it is desirable to complete the lane change to ensure the traveling purpose. Further, when the lane change is canceled, it is conceivable that the driver rushes to merge into the lane in a state where the safety confirmation is insufficient. It is desirable to complete the lane change from the view of safety.

In the case of (C), since the vehicle has already entered the main lane from the merging lane, it is more likely that the safety of the vehicle can be secured by completing the lane change than returning to the original lane. In addition, the driving purpose can be achieved by completing the lane change to merge.

For another example, based on the travel plan without diverging to the left or turning left for a certain period of time, the position information of the vehicle acquired from the GPS, and the map information acquired from the map database, when the subject vehicle is determined to travel on a lane other than the leftmost lane, the purpose identification unit 106 identifies that the purpose of the lane change is the keep left.

The keep left as the purpose of the lane change may include a case where the subject vehicle merges from the right merging lane into the main lane, a case where the subject vehicle returns to the left lane after moving to the passing lane (right lane) in order to overtake the preceding vehicle, or a case where the subject vehicle returns to the left lane after moving to the right lane in order to avoid the obstacle on the road.

In the case where the purpose of the lane change is keep left, similarly to the case of the purpose of arriving at the destination, when the operation related to the lane change at the time of occurrence of abnormality is (A), the lane change of the vehicle is canceled, and when it is (B) or (C), the lane change is completed.

The reason for canceling or completing the lane change in the case of (A), (B), or (C) is as follows.

In the case of (A), similarly in the case of the destination arrival or lane merge as the purpose, it is desirable from the view of safety to continue traveling on the present lane while confirming safety. In this case, the lane change can be promptly performed by manual driving by the driver.

In the case of (B), it is desirable to complete the lane change in order to comply with the law. In addition, it is determined that the subject vehicle can safely change to the adjacent lane, and the left lane to be changed is the lower speed zone. Thus, it is desirable from the view of safety to complete the lane change, and the traveling purpose can be achieved by completing the lane change.

In the case of (C), since the vehicle has already entered the adjacent lane, it is more likely that the safety of the vehicle can be secured by completing the lane change than returning to the original lane. In addition, the driving purpose can be achieved by completing the lane change.

In the above example, it is assumed that the vehicle travels in left-hand traffic. Alternatively, it is assumed that the vehicle travels in right-hand traffic, the vehicle may change the lane for the purpose of keep right. When the purpose of the lane change is keep right, the vehicle cancels or completes the lane change according to the operation related to the lane change at the time of occurrence of the abnormality, similarly to the case of the keep left.

(2) When the purpose of the lane change is a course change at a diversion point

The operation in the case where the purpose of the lane change is a course change at a diversion point will be exemplified.

For example, based on the travel plan for the diversion, the position information of the vehicle acquired from the GPS, and the map information acquired from the map database, when it is determined that the subject approaches to the diversion point, the purpose identification unit 106 identifies that the purpose of the lane change is the course change at the diversion point.

In this case, the vehicle completes the lane change regardless of whether the operation related to the lane change at the time of occurrence of the abnormality is (A), (B), or (C).

The subject vehicle preferably lights a turn signal for three seconds before changing lanes to signal the lane changes to the surrounding vehicles. When the operation related to the lane change at the time of occurrence of abnormality is (A) and the turn signal has already been lighted, the time required to reach the diversion point is only about three seconds. Therefore, when the vehicle switches from autonomous driving to manual driving, it is highly possible that the vehicle will pass through the diversion point. In this case, the vehicle cannot travel on the scheduled road based on the travel plan, and cannot arrive at the destination. When the vehicle changes the lane, for the purpose of changing the course at the diversion point, the driving purpose can be achieved by completing the lane change regardless of the lane change operations (A) to (C) when an abnormality occurs.

In addition, there is often no space where the vehicle can safely stop at the diversion point. Therefore, from the view of safe driving, it is desirable to complete the lane change and stop the vehicle after the lane change is completed or switch to manual driving.

(3) When the purpose of lane change is to avoid obstacle on the road

The operation in the case where the purpose of the lane change is to avoid obstacle on the road will be exemplified.

For example, based on image information indicating a broken vehicle that is stopped on the road, or peripheral information that is received by wireless communication from a roadside machine and that indicates that there is a restricted traffic section ahead of the road, when it is determined that there is an obstacle for the subject vehicle on the road, the purpose identification unit 106 identifies that the purpose of the lane change is to avoid obstacle on the road.

The obstacle of the present disclosure indicates a physical or conceptual barrier on the traveling lane. The obstacle may include a falling object, a broken vehicle, or a vehicle on the merged lane, which exists on the traveling route of the subject vehicle. The obstacle may further include a road accident, a construction, or a traffic restriction that specifies the type of vehicle and lane.

When the operation related to the lane change at the time of occurrence of abnormality is (A), the lane change of the vehicle is canceled. On the other hand, in the case of (B) and (C), the lane change is to be completed.

When the operation related to the lane change at the time of occurrence of an abnormality is (A), the vehicle switches to manual driving by the driver while traveling in the lane on which the vehicle originally travels, or the vehicle stops before contacting the obstacle and switches to manual driving by the driver. Thereafter, the driver changes the lane to avoid the obstacle by manual driving and continues to travel to the destination.

The reason for canceling the lane change in the case of (A) is that the vehicle is in a situation that the vehicle has not started changing the lanes and it has not been determined that the vehicle is capable of changing the lane safely. Thus, it is desirable, from the view of safety, to continue traveling in the present lane while confirming safety. In the case of (A), since there is time before the vehicle arrives at the obstacle, it is highly possible that the driver can avoid the obstacle by changing the lane by manual driving.

On the other hand, when the operation related to the lane change at the time of occurrence of an abnormality is (B) or (C), the vehicle switches to manual driving by the driver while traveling in the changed lane, or the vehicle switches to manual driving by the driver after the vehicle stops in a safe place.

Since it is determined that the subject vehicle can safely change to the adjacent lane, the subject vehicle completes the lane change in the case of (B) or (C). Thus, it is desirable, from the view of safety, to complete the lane change to the adjacent lane that has been confirmed to be safer than the present lane where the obstacle exists, and it is possible to secure the purpose of traveling to the destination by avoiding the obstacle.

(4) When the purpose of lane change is to overtake the preceding vehicle

The operation in the case where the purpose of lane change is to overtake the preceding vehicle will be exemplified.

For example, based on travel plan without diverging to the right or turning right for a certain period of time, image information indicating a vehicle traveling ahead, the speed information of vehicle that travels in front of the subject vehicle or on the surrounding lane, speed limit information of the road on which the subject vehicle travels, and information of the turn signal lighting to the passing lane side, when it is determined that the subject vehicle is to be overtake the preceding vehicle, the purpose identification unit 106 identifies that the purpose of the lane change is to overtake the preceding vehicle. When the purpose identification unit 106 identifies that the purpose of the lane change is to overtake the preceding vehicle, maximum traveling speed (for example, 100 km/h) preset by the driver may be used in addition to the above described information.

When the operation related to the lane change at the time of occurrence of abnormality is (A) or (B), the lane change of the vehicle is canceled. On the other hand, in the case of (C), the lane change is to be completed.

When the purpose of the lane change of the subject vehicle is to overtake the preceding vehicle, the presence or absence of the lane change does not affect the traveling purpose of which the vehicle arrives at the destination. In addition, when the operation related to the lane change at the occurrence of an abnormality is (A) or (B), it is better to continue to drive in the present lane that is in the low speed range than the passing lane that is in the high speed range from the view of safety.

Therefore, in the case of (A) and (B), even when the lane change is canceled, both the traveling purpose and the safe traveling can be ensured.

In the case where the operation related to the lane change at the time of occurrence of abnormality is (C), since the vehicle has already entered the adjacent lane, it is more likely that the safety of the vehicle can be secured by completing the lane change than returning to the original lane. Therefore, in the case of (C), the lane change is to be completed, and the safety of the vehicle can be secured.

(5) When the purpose of the lane change is to stop the vehicle when the driver is in an abnormal state The operation in the case where the purpose of lane change is to stop the vehicle when the driver is in the abnormal state.

It is desirable to stop the vehicle when the driver cannot drive due to a poor physical condition or a doze of the driver. Therefore, it is conceivable that the autonomous driving vehicle safely stops on a road shoulder or stops on the road shoulder after changing the lane when it is detected that the driver cannot drive.

The driver information input from the driver information detection unit 203 of the autonomous driving vehicle having such a function may indicate a poor physical condition or a doze of the driver, or indicate that the driver cannot drive. In this case, the purpose identification unit 106 identifies the purpose of the lane change is to stop the vehicle when the driver is in the abnormal state.

The abnormality may occur in the in-vehicle system during the operation related to the lane change for the purpose of stopping the vehicle when the driver is in abnormal state. In this case, the vehicle completes the lane change even in the case of (A), (B), or (C) for the operation related to the lane change of the vehicle when the abnormality occurs.

As described above, when the abnormality occurs in the driver, it is desirable to stop the vehicle as soon as possible from the view of safety. Thus, when the abnormality occurs in the in-vehicle system during the operation related to the lane change for stopping the vehicle due to the abnormality in the driver, the vehicle completes the lane change, moves to the safe lane, and stop the vehicle.

When a further lane change is necessary to stop the vehicle safely, it is desirable that the electronic control device 100 completes the lane change until the vehicle moves to a lane where the vehicle can stop at the safe place.

Note that the above-described combination between the operation related to the lane change at the occurrence of an abnormality and the purpose of the lane change, and the determination of completion or cancellation of the lane change is an example, and is not limited to the above described combination.

The combination between the operation related to the lane change at the occurrence of an abnormality and the purpose of the lane change, and the determination of completion or cancellation of the lane change may be set in advance in a vehicle manufacturing factory or a manufacturing factory of the electronic control device, or may be set in advance by the driver of the vehicle.

(First Modification)

In the purpose (5) of the first embodiment, the instruction content of the lane change control unit 107 when an abnormality occurs in the in-vehicle system at the time of lane change for the purpose of stopping the vehicle when the driver is in abnormal state has been described.

It is assumed that the purpose of changing the lane is not for stopping the vehicle when the driver is in the abnormal state, for example, each of the cases (1) to (4) of the first embodiment. In this case, when the information input from the driver information detection unit 203 indicates an abnormality of the driver, the lane change control unit 107 issue an instruction to complete or cancel the lane change different from that in the first embodiment according to the direction in which the vehicle intends to change the lane.

For example, an abnormality may occur in the in-vehicle system while the vehicle is changing the lane from the present lane to the left lane, and the driver information may indicate a poor physical condition of the driver. In this case, the lane change control unit 107 completes the lane change to the left lane regardless of whether the operation related to the lane change when the abnormality occurs is any of cases (A) to (C).

This is because, on left-hand road, it is desirable from the view of safety to stop in the leftmost lane.

On the other hand, an abnormality may occur in the in-vehicle system while the vehicle is changing the lane from the present lane to the right lane, and the driver information may indicate a poor physical condition of the driver. In this case, the lane change control unit 107 cancels the lane change to the right lane when the operation related to the lane change when the abnormality occurs is case (A) or (B).

As described above, it is desirable to stop in the leftmost lane on the left-hand road. When the vehicle completes the lane change to the right, it is necessary to change the lane to the left again in order to stop the vehicle. In this configuration, in the case of (A) or (B), the lane change to the right is canceled. In the case of (C), since the vehicle has already entered the adjacent lane, it is more likely that the safety of the vehicle can be secured by completing the lane change than returning to the original lane so that the vehicle completes the lane change.

(Second Modification)

The electronic control device 100 may further include an abnormality notification unit that notifies the driver that an abnormality has occurred when an abnormality occurs in the in-vehicle system or the vehicle driver.

For example, when an abnormality occurs in the in-vehicle system, the abnormality notification unit immediately notifies the driver that an abnormality has occurred. When the driver is to be in a state where the driver can safely take over the driving from the autonomous driving to the manual driving, the autonomous and manual instruction unit 108 requests the driver to switch to the manual driving.

In the above-described configuration, the driver is notified of the occurrence of abnormality and the request for switching driving in two stages. Thus, the driver can immediately recognize that an abnormality has occurred in the in-vehicle system, and can safely take over the driving from the autonomous driving to the manual driving.

In the present disclosure, the terms right direction (left direction), right side (left side), right turn (left turn), and right (left) are used as descriptions related to road traffic. These descriptions are given as an explanation when the right-hand traffic rule is applied like Japan. Therefore, when the right-hand traffic rule is applied, the right and left are switched.

The electronic control device according to each embodiment of the present disclosure have been described above.

The operation of the electronic control device in the embodiments has been described also as a method, with reference to the block diagrams and the flowcharts. The above methods can be realized not only by the above-described manners, but also by a program recorded in a recording medium such as a memory or a hard disk, and a combination with a microcomputer having a dedicated or general-purpose CPU and a memory for executing the program. The program can also be provided from a server through a communication line without using a recording medium. This allows the latest functions to be provided at all times through program upgrades.

Although the electronic control device according to the present disclosure is mainly used for controlling the travel of an automobile, the electronic control device may be used for controlling the travel of a vehicle other than the automobile, for example, a motorcycle, an electrically assisted bicycle, or the like. Moreover, the present disclosure is not limited to those applications.

The flowcharts or the processing depicted in the flowcharts according to the present disclosure include a plurality of sections (alternatively referred to as steps) each indicated as S101 or the like. Some of the sections may be further divided into a plurality of subsections or may be appropriately combined to configure a single section. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. An electronic control device provided in a vehicle having autonomous driving capabilities for determining whether to complete a lane change during an autonomous driving of the vehicle at a time when an abnormality occurs in an in-vehicle system, the electronic control device in communication with the in-vehicle system and comprising:
   a processor configured to:
      detect the abnormality that occurs in the in-vehicle system;
      detect an operation related to the lane change of the vehicle;
      identify the operation related to the lane change at the time when the abnormality occurs;
      store a travel plan for performing the autonomous driving of the vehicle;
      acquire at least one of a subject vehicle information item on the vehicle, a surrounding information item on a surrounding environment of the vehicle, and a driver information item on a driver of the vehicle;
      identify a purpose of the lane change of the vehicle based on at least one of the travel plan, the subject vehicle information item, the surrounding information item, and the driver information item; and
      determine whether to complete or cancel the lane change based on the operation related to the lane change at the time when the abnormality occurs and the purpose of the lane change, and to output an instruction to change a steering angle of the vehicle to complete or cancel the lane change, wherein
   the processor is further configured to identify the operation related to the lane change at the time when the abnormality occurs from operations respectively performed (A) before the vehicle starts the lane change, (B) after the vehicle starts the lane change and before the vehicle enters an adjacent lane, and (C) after the vehicle enters the adjacent lane,
   in response to identifying that the purpose of the lane change is to pass through a diversion point that (i) branches off from the adjacent lane and (ii) is necessary for traveling on a scheduled road based on the travel plan, the processor is further configured to:
      output the instruction to change the steering angle of the vehicle to complete the lane change to reach the diversion point regardless of the identified operation related to the lane change at the time when the abnormality occurs;
      output an instruction to switch from the autonomous driving of the vehicle to manual driving of the vehicle after the lane change is completed and after the vehicle has traveled in the adjacent lane for a predetermined distance; and
      output a notification to the driver of the vehicle to switch to manual driving of the vehicle after the lane change is completed and after the vehicle has traveled in the adjacent lane for the predetermined distance.

2. The electronic control device according to claim 1, wherein:
   in response to the processor identifying that the purpose of the lane change is a destination arrival based on the travel plan, a lane merge, a keep left, or a keep right, and identifying that the operation is the operation performed (A) before the vehicle starts the lane change, the processor is further configured to output the instruction to change the steering angle of the vehicle to cancel the lane change; and
   in response to the processor identifying that the purpose of the lane change is the destination arrival based on the travel plan, the lane merge, the keep left, or the keep right, and identifying that the operation is the operation performed (B) after the vehicle starts the lane change and before the vehicle enters an adjacent lane or the operation performed (C) after the vehicle enters the adjacent lane, the processor is further configured to output the instruction to change the steering angle of the vehicle to complete the lane change.

3. The electronic control device according to claim 1, wherein:
   in response to the processor identifying that the purpose of the lane change is to avoid an obstacle on a travel route of the vehicle and identifying that the operation is the operation performed (A) before the vehicle starts the lane change, the processor is further configured to output the instruction to change the steering angle of the vehicle to cancel the lane change; and
   in response to the processor identifying that the purpose of the lane change is to avoid the obstacle on the travel route of the vehicle and identifying that the operation is the operation performed (B) after the vehicle starts the lane change and before the vehicle enters an adjacent lane or the operation performed (C) after the vehicle enters the adjacent lane, the processor is further configured to output the instruction to change the steering angle of the vehicle to complete the lane change.

4. The electronic control device according to claim 1, wherein:
   in response to the processor identifying that the purpose of the lane change is to overtake a preceding vehicle and identifying that the operation is the operation performed (A) before the vehicle starts the lane change or the operation performed (B) after the vehicle starts the lane change and before the vehicle enters an adjacent lane, the processor is further configured to output the instruction to change the steering angle of the vehicle to cancel the lane change; and in response to the processor identifying that the purpose of the lane change is to overtake the preceding vehicle and identifying that the operation is the operation performed (C) after the vehicle enters the adjacent lane, the processor is further configured to output the instruction to change the steering angle of the vehicle to complete the lane change.

5. The electronic control device according to claim 1, wherein in response to the processor identifying that the purpose of the lane change is to stop the vehicle due to an abnormality of the driver, the processor is further configured to output the instruction to change the steering angle of the vehicle to complete the lane change regardless of the operation related to the lane change at the time when the abnormality occurs.

6. The electronic control device according to claim 1, wherein the processor is further configured to output a notification to the driver that the abnormality occurs at the time when the abnormality occurs in the in-vehicle system.

7. The electronic control device according to claim 1, wherein the operation related to the lane change at the time when the abnormality occurs, the purpose of the lane change, and the determination to complete or cancel the lane change are preset instructions input to the processor.

8. A vehicle control method for determining whether to complete a lane change during an autonomous driving of a vehicle at a time when an abnormality occurs in an in-vehicle system, the method comprising:

detecting the abnormality that occurs in the in-vehicle system;

detecting an operation related to the lane change of the vehicle;

identifying the operation related to the lane change at the time when the abnormality occurs;

acquiring at least one of a subject vehicle information item on the vehicle, a surrounding information item on a surrounding environment of the vehicle, and a driver information item on a driver of the vehicle;

identifying a purpose of the lane change of the vehicle based on at least one of a travel plan to perform an autonomous driving of the vehicle, the subject vehicle information item, the surrounding information item, and the driver information item;

determining whether to complete or cancel the lane change based on the operation related to the lane change at the time when the abnormality occurs and the purpose of the lane change; and outputting an instruction to change a steering angle of the vehicle to complete or cancel the lane change, wherein in identifying the operation related to the lane change at the time when the abnormality occurs, the operation is identified from operations respectively performed (A) before the vehicle starts the lane change, (B) after the vehicle starts the lane change and before the vehicle enters an adjacent lane, and (C) after the vehicle enters the adjacent lane, in response to identifying that the purpose of the lane change is to pass through a diversion point that (i) branches off from the adjacent lane and (ii) is necessary for traveling on a scheduled road based on the travel plan, outputting the instruction to change the steering angle to complete the lane change to reach the diversion point regardless of the identified operation related to the lane change at the time when the abnormality occurs, and the method further comprises:

outputting an instruction to switch from the autonomous driving of the vehicle to manual driving of the vehicle after the lane change is completed and after the vehicle has traveled in the adjacent lane for a predetermined distance; and outputting a notification to the driver of the vehicle to switch to manual driving of the vehicle after the lane change is completed and after the vehicle has traveled in the adjacent lane for the predetermined distance.

9. A non-transitory tangible computer readable storage medium comprising instructions executed by a processor of an electronic control device, the instructions for determining whether to complete a lane change during an autonomous driving of a vehicle at a time when an abnormality occurs in an in-vehicle system, the instructions comprising:

detecting the abnormality that occurs in the in-vehicle system;

detecting an operation related to the lane change of the vehicle;

identifying the operation related to the lane change at the time when the abnormality occurs;

acquiring at least one of a subject vehicle information item on the vehicle, a surrounding information item on a surrounding environment of the vehicle, and a driver information item on a driver of the vehicle;

identifying a purpose of the lane change of the vehicle based on at least one of a travel plan to perform an autonomous driving, the subject vehicle information item, the surrounding information item, and the driver information item;

determining whether to complete or cancel the lane change based on the operation related to the lane change at the time when the abnormality occurs and the purpose of the lane change; and outputting an instruction to change a steering angle of the vehicle to complete or cancel the lane change, wherein in identifying the operation related to the lane change at the time when the abnormality occurs, the operation is identified from operations respectively performed (A) before the vehicle starts the lane change, (B) after the vehicle starts the lane change and before the vehicle enters an adjacent lane, and (C) after the vehicle enters the adjacent lane, in response to identifying that the purpose of the lane change is to pass through a diversion point that (i) branches off from the adjacent lane and (ii) is necessary for traveling on a scheduled road based on the travel plan, outputting the instruction to change the steering angle to complete the lane change to reach the diversion point regardless of the identified operation related to the lane change at the time when the abnormality occurs, and the instructions further comprise:

outputting an instruction to switch from the autonomous driving of the vehicle to manual driving of the vehicle after the lane change is completed and after the vehicle has traveled in the adjacent lane for a predetermined distance; and outputting a notification to the driver of the vehicle to switch to manual driving of the vehicle after the lane change is completed and after the vehicle has traveled in the adjacent lane for the predetermined distance.

\* \* \* \* \*